United States Patent Office 3,539,326
Patented Nov. 10, 1970

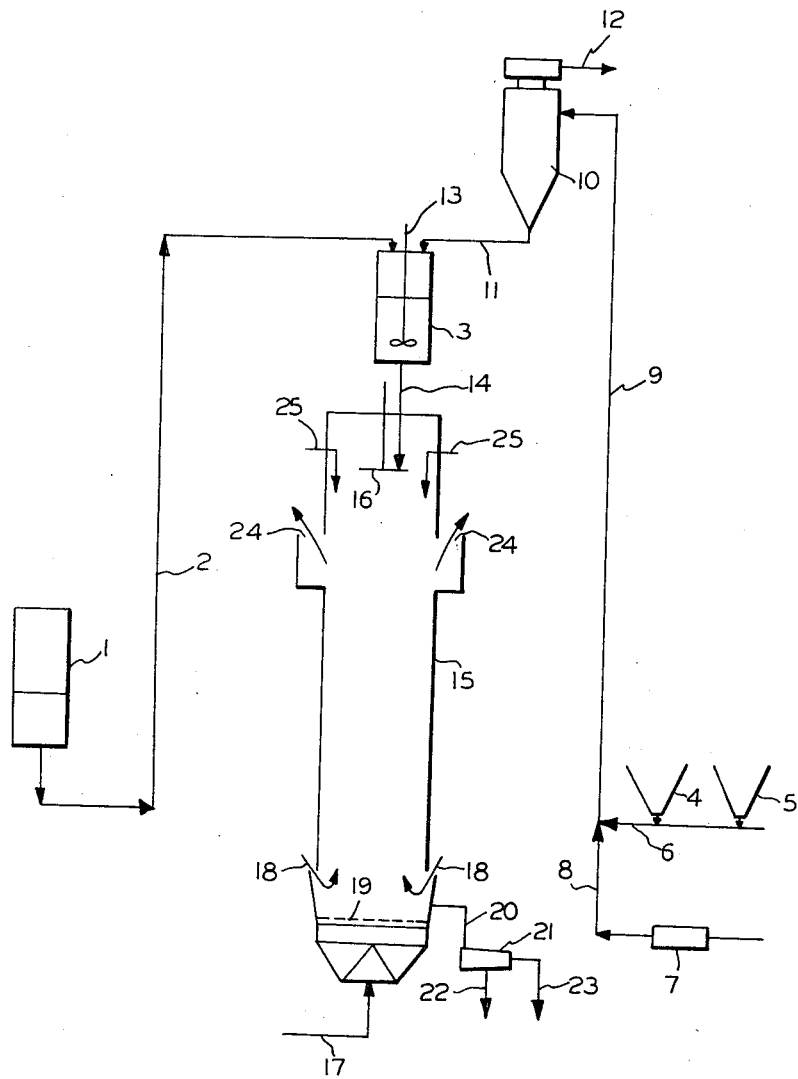

3,539,326
PROCESS FOR PRODUCING GRANULAR
COMPOUND FERTILIZER
Eiji Otsuka, Fujisawa, Minoru Takada and Kiyoshi Matsuo, Kamakura, Hitoshi Murozono, Yokohama, and Tokio Nagayama, Hatano, Japan, assignors to Mitsui Toatsu Chemicals Incorporated, Tokyo, Japan, a corporation of Japan
Filed Mar. 31, 1967, Ser. No. 627,438
Claims priority, application Japan, Apr. 1, 1966, 41/19,968; May 24, 1966, 41/32,699; Jan. 16. 1967, 42/2,753
Int. Cl. C05c 9/00
U.S. Cl. 71—28                                   23 Claims

ABSTRACT OF THE DISCLOSURE

A process for producing granular compound fertilizers containing nitrogen and phosphorus and/or potassium which comprises mixing a preheated solid phosphate and/or a preheated potassium salt with a melt liquid of urea and/or ammonium nitrate to form a melt mixture, dividing the melt mixture into droplets and solidifying the droplets by cooling.

---

This invention relates to an improved process for producing a granular compound fertilizer containing at least two components of nitrogen and phosphorus and/or potassium.

In producing granular compound fertilizers containing urea or ammonium nitrate as the nitrogen source and ammonium phosphates or potassium phosphates as the phosphorus source and/or potassium chloride, potassium sulfate or potassium nitrate as the potassium source there is generally used a pan granulation method comprising mixing the raw materials for the fertilizer, adding a suitable amount of water to the resulting mixture, granulating the mixture by rolling it in a rotary granulator and drying the resulting granules. However, this granulating method has defects in that the granulating yield is so low that the amount of recirculation of the product to the granulating step is large and in that the deposition of the product on the inside wall of the dryer in drying the product is so much that the operation must be interrupted frequently.

There has also been previously proposed a process for producing granular compound fertilizers containing urea wherein a melting point-lowering agent is added as required to the raw materials, the resulting mixture is heated to form a melt, if desired ammonium phosphate is added to the melt and uniformly melted, and the resulting melt or slurry is granulated by dropping or jetting it as droplets through nozzles into a cooling tower. However, since there are problems on an industrial scale of providing melting apparatus of sufficient capacity for the raw materials and such operating difficulties as frequent clogging of the nozzles, this method has not yet been industrialized.

An object of this invention is to provide an economical process for producing a granular compound fertilizer containing nitrogen and phosphorus and/or potassium.

Another object of this invention is to provide an improved method of preparing a raw material melt mixture for producing granular fertilizer.

A further object of this invention is to provide an efficient method of prilling a raw material melt mixture in the production of granular compound fertilizer.

According to this invention we provide a process for producing granular compound fertilizers containing nitrogen and phosphorus and/or potassium which comprises mixing at least one preheated solid phosphate selected from the group consisting of ammonium phosphates and potassium phosphates and/or at least one preheated solid selected from the group consisting of potassium chloride, potassium sulfate and potassium nitrate with a melt liquid of a compound selected from the group consisting of urea, ammonium nitrate and mixtures thereof to form a melt mixture and converting the melt mixture into granular form by dividing the melt mixture into liquid droplets and cooling the resulting droplets to solidify them.

Thus, when a granular compound fertilizer containing nitrogen and phosphorus is to be produced, ammonium phosphate is added to the melt solution; when a granular compound fertilizer containing nitrogen and potassium is to be produced, a potassium salt as described above is added to the melt solution; and when a granular compound fertlizer containing nitrogen, phosphorus and potassium is to be obtained, ammonium phosphate or potassium phosphate and a potassium salt as listed above are added to the melt solution.

The terms "melt liquid" or "melt solution" as used herein are meant to also include concentrated aqueous solutions which solidify at normal temperatures but remain liquid at higher temperatures, as well as melts or concentrated aqueous solutions which contain suspended solutions and which solidify at normal temperatures but remain liquid at higher temperatures.

Ammonium phosphates used in this invention include ammonium dihydrogen phosphate and diammonium hydrogen phosphate and the potassium phosphates used in this invention include potassium dihydrogen phosphate, dipotassium hydrogen phosphate and tripotassium phosphate.

It is already known that, when the above-mentioned raw materials are mixed at temperatures at which they are normally solid, e.g., in the state of powders, and the resulting mixture is melted to form a melt mixture, the mixture passes through a sludgy state of high viscosity and then reaches the melting state of the lowest viscosity. However, the rate of heat transfer of the high viscosity substance during the melting is so low that the time required for the melting is excessively long. Therefore, the viscosity rises due to the decomposition and condensation of urea, ammonium nitrate and the phosphates in the mixture and due to the double decomposition reactions between the respective raw materials. Thus, it is difficult to obtain a stable melt which can be easily converted into granular form. Needless to say, theoretically, the melting or prilling operation may be carried out by making a quick heat transmission so that the melting may be completed before any substantial decomposition, condensation and double decomposition occur. However, on an industrial scale, the required area of heat transfer is so large that the apparatus volume must be excessively large, the residence time in the melting apparatus is considerably long and the above-mentioned difficulty is again encountered.

The above-mentioned difficulty is eliminated by the present invention by preheating the solid phosphate and/or potassium salt and then adding the preheated phosphate and/or potassium salt to a melt liquid or an aqueous solution of urea and/or ammonium nitrate or adding the preheated phosphate and/or potassium salt in two steps by dividing the material to be added into two batches according to the mixing ratio (i.e., the amount of phosphate and/or potassium salt to the amount of molten urea and/or ammonium nitrate) of the raw materials. Needless to say, the solid phosphate and/or potassium salt may be used as a mixture.

Generally, in such systems as, for example, urea-ammonia phosphate, urea-potassium salt or urea-ammonium phosphate-potassium salt systems, when heated, the urea (or ammonium nitrate when it is used) melts completely and a part of the ammonium phosphate or potassium salt melts eutectically together with urea but the balance does not melt and is in a state of suspension in the resulting melt. According to our experiments, for example, in a urea-ammonium dihydrogen phosphate system, the eutectic temperature is 119 to 120° C. and the eutectic composition is about 20% by weight of ammonium dihydrogen phosphate. In a urea-potassium chloride system, the eutectic temperature is 116° C. and the eutectic composition is 12.5% by weight of potassium chloride. The ammonium phosphate or potassium chloride in excess of that in the above-mentioned eutectic compositions is dispersed in the molten urea. This fact is the same also when urea is substituted by ammonium nitrate. Therefore, when producing a compound fertilizer containing the three components of nitrogen, phosphorus and potassium in high concentration or containing the two components of nitrogen and phosphorus or potassium in high concentration, the phosphate or potassium salt in excess of the eutectic composition (which is always present in melting raw materials) elevates the viscosity of the melt; thereby the rate of heat transfer becomes controlling and a long time is required for adequate melting.

In considering the heat input and output when preparing a melt mixture at 130° C. from a mixture, for example, of urea, ammonium dihydrogen phosphate and potassium chloride at the normal temperature, it is found that, generally, when producing a high analysis compound fertilizer (though different depending on the mixing ratio of the above-mentioned raw materials), 50 to 70% of the total required heat is required to melt the urea. For example, in the case of production of a compound fertilizer of $N:P_2O_5:K_2O=22:16:16$ from urea, ammonium phosphate and potassium chloride, the sum of the sensible heat and heat of fusion required to melt the urea at the required temperature is 60% of the total required heat and the remaining 40% is the sum of the latent heat required to melt eutectically the ammonium phosphate and potassium chloride together with urea and the sensible heat required to heat the ammonium phosphate and potassium chloride from the normal temperature to 130° C., the amount of the latent heat being substantially equal to the amount of the sensible heat.

As another example, when producing fertilizers containing nitrogen and phosphorus in one case and nitrogen and potassium in the other case (though different depending on the mixing ratio) in the range of $N:P_2O_5=20$ to 28:38 to 25 $N:K_2O=11$ to 22:44 to 29, in obtaining a melt mixture at 130° C. from solid raw materials at normal temperature, the sum of sensible heat and heat of fusion required to heat the urea to and melt it at 130° C. is 45 to 65% of the total heat required in the case of urea and ammonium dihydrogen phosphate and 60 to 75% in the case of urea and potassium chloride. The rest of the total heat is the sum of the latent heat required to eutectically melt ammonium dihydrogen phosphate or potassium chloride, respectively, and sensible heat required to heat the ammonium dihydrogen phosphate or potassium chloride, respectively, from normal temperature to 130° C.

Therefore, when urea and/or ammonium nitrate is melted in advance in a conventional melter or molten urea or an aqueous solution of urea which can be fed from a urea plant is used and ammonium phosphate or potassium chloride or a mixture of ammonium phosphate and potassium chloride as preheated to preferably 60 to 200° C. is added thereto, the amount of heat transfer required in preparing the melt is so small that the industrially important problem of heat transfer in the melting apparatus can be solved and a melt mixture can be obtained by merely mixing preheated ammonium phosphate and/or potassium chloride with molten urea. Furthermore, this mixing can be easily carried out in any conventional mixer having a stirrer or an extruder type rotary screw. Since the time required for the mixing and melting is greatly reduced, the decomposition and condensation of the raw materials can be inhibited and the prilled product is of a composition not substantially different from that of the mixing ratio before melting. In the following description ammonium nitrate can be substituted for some or all of the urea specified. In preparing the melt mixture containing urea, ammonium phosphate and/or potassium salt, it has been already attempted to reduce the melting point or to reduce the viscosity of the finally obtained melt by adding a small amount of water. In the present invention, there is obtained an effect of elevating the economy of the process by using an aqueous solution of urea or ammonium nitrate for the same purpose. As described above, when crystalline urea is used as a raw material, more than half the heat required to melt the raw material for compound fertilizer is equivalent to the heat of fusion of urea. This heat of fusion can be perfectly saved by using molten urea and/or ammonium nitrate or an aqueous solution of urea and/or ammonium nitrate from a urea and/or ammonium nitrate plant. Further, in respect to the producing equipment of the urea plant, as compared with the case of using crystal urea, the steps of concentrating an aqueous solution of urea, crystallizing urea from the concentrated solution, centrifugally separating urea crystals from mother liquor and drying separated crystals can be saved; therefore the equipment required for these steps can be omitted and the heat economy of the process increases. The concentration of the aqueous solution of urea to be used is restricted by the maximum amount of water which can be tolerated in the final product and is preferably controlled to be within a range in which a subsequent drying step can be omitted. An aqueous solution of a concentration of more than 80% by weight, specifically of 85 to 95% by weight urea, can be favorably used by spraying it on the surface of the melt mixture, whereby a large portion of the water contained in the solution is evaporated. The same considerations apply to ammonium nitrate.

The solid phosphate and potassium salt to be used in this invention are preferably of a particle size small enough to wholly pass through a sieve of 30 meshes per linear inch.

Generally, in the case of mixing and dispersing a preheated mixture, for example, of ammonium phosphate and potassium chloride into molten urea, when the ratio of the mixture to be fed to the molten urea (i.e., the mixing ratio) is 1–1.5 to 1, a melt mixture can be comparatively easily obtained by properly selecting the relation between the diameter of the stirring vane and the diameter of the mixing tank and the number of stirring revolutions. When the ratio approaches or exceeds 2 (for example, in the case of a fertilizer composition of $N:P_2O_5:K_2O=18:18:18$ or when the phosphate or potassium salt is present above this ratio), the dispersion of the mixture fed onto the surface of the stirred melt mixture into the melt rapidly becomes difficult, the feeding velocity of the mixture relative to the dispersing velocity into the melt becomes unbalanced, the mixture accumulates on the surface of the melt mixture, a cakey slurry of a high viscosity is formed and the operation becomes very difficult.

In the present invention this difficulty can be also overcome by uniformly spraying molten urea or an aqueous solution of urea onto the surface of the melt mixture with a proper nozzle or atomizer. That is to say, the surface of the melt mixture can be made uniform and local increases in viscosity can be prevented by spraying molten urea or an aqueous solution of urea over the entire surface of the stirred melt rather than by feeding it merely as one flow. Needless to say, it is desirable to disperse the mixture to be fed over as wide a range of the surface of the melt mixture as possible. The aqueous solution fed in the form of a spray has the water instantly evaporated before the liquid drops reach the surface of the melt mixture. Further, some amount of the fed water can be evaporated in the mixing tank and prilling step. As a result, the water content in the granular compound fertilizer product is so small as to be 1 to 2% and no subsequent drying operation is required. The same considerations apply when using ammonium nitrate and other potassium salts or phosphates.

Further for the control of the water content in the product, it is possible to adjust the evaporating velocity at the time of spraying by heating the aqueous solution of urea or ammonium nitrate during its conveyance to the melt mixture and, if necessary, by feeding some air onto the surface of the melt mixture in the mixing tank to promote the evaporation of water.

Depending on the kinds and/or mixing ratios of the raw materials (specifically if the ratio of the mixture of phosphate and potassium salt to the melt is large), it may be very difficult to disperse the mixture into the melt. In such case, the difficulty can be avoided by adding a part of the preheated mixture of phosphate and potassium salt into the melt in advance to form a melt mixture of a low viscosity and then adding the rest of the mixture to it. This method is useful for suppressing such reactions as the decomposition, condensation and double decomposition by further reducing the time during which the sludgy high viscosity state is passed through. In such case, the preheating of the powder is very effective to accelerate the penetration of the powder of the mixture of phosphate and potassium salt into the melt and to facilitate the dispersion of the mixture into the melt.

In this invention, amounts of other compounds such as ammonium sulfate, ammonium chloride, calcium superphosphate, calcium sulfate or magnesium hydroxide may be added to the melt solution of urea and/or ammonium nitrate together with the phosphate, potassium salt or mixtures thereof or to the melt mixture prior to being converted into granular form in order to control the concentration of nitrogen, phosphorus or potassium in the resulting compound fertilizer and/or in order to introduce calcium or magnesium values into the compound fertilizer.

The prilling method by which the melt mixture obtained by the above-mentioned method can be converted into granular form is described hereinafter. Generally, according to any conventional prilling method, it is very difficult to divide a melt mixture of a high viscosity into liquid droplets. Various special methods have been invented for this purpose. But, in any of them, the viscosity of the melt mixture and the amount of solids contained by the melt mixture are limited.

In dividing a melt mixture into liquid droplets by nozzles such as those through which a melt mixture drops by gravity, pressure spray nozzles or rotary current nozzles, the clogging of the nozzle is the greatest difficulty to be overcome. The method of dividing suspension melts is gradually shifting to a special rotary disk method.

As prilling methods using a rotary disk, there have been suggested such various methods as with horizontal disks, multi-blade disks, Kestner rotary sprayers or rotary caps. Due to their mechanisms, even if there are solids present, it is possible to treat the melt without such difficulty as experienced in the use of nozzles. However, such phenomena as the deviation of the product prill composition due to the difference between the slips of the solids and melt on the rotary plate and the deposition of the solids on the surface of the plate by the centrifugal force still remain unsolved in handling specifically a melt mixture containing solids in high concentration and such rotary disk methods have not been made practical. In the above, there have been chiefly described mechanical problems in dividing a melt mixture into droplets due to its properties. However, in fact, the particle size distribution and the velocity in the vertical direction of the produced liquid droplets and the flying distance in the horizontal direction of the liquid droplets relate with the size of the prilling tower to the quality of the product and are therefore important. In the method using a spray nozzle, a deposition of droplets on the tower wall occurs depending on the jetting angle and the jetting velocity is so high that, when comparatively large grains are to be made, the height of the tower must be large to provide the residence time required for cooling when using air. In the method using a rotary disk, the flying distance in the horizontal direction is so large that the diameetr of the tower must be considerably increased and the deposition of droplets on the tower wall is also still a problem in the operation.

The method of dividing a melt into droplets adopted in the present invention provides a convenient and easy means of solving the above-mentioned problems. In this invention, a metal screen, a sieve plate, or a wheel having radial bars or spokes is used and kept stationary or under rotation or vibration so that a melt fed on it may be divided into droplets by collision or by vibration or rotation after the collision. The resulting droplets are solidified by cooling with air or an inert cooling liquid to form a granular product.

In dividing melt mixtures of such comparatively low viscosity as less than 1500 centipoises (measured at 130° C.) into droplets, they may be fed to collide with a horizontally set metal screen of 3 to 20 meshes made of, for example, stainless steel, by giving it a proper head. In this case, the particle size can be easily adjusted by adjusting the falling head, the size of the screen meshes and the vibration of the screen. The falling head is preferably in the range of 10 to 200 cm. and the number of vibrations is preferably in the range of 50 to 500 per minute. As a method of giving such vibration, there is used a method involving a horizontal rectilinear reciprocation, by an elliptic reciprocation in the same plane or by recurrent impacts.

In dividing melt mixtures of such high viscosity as about 1500 to 5000 centipoises (measured at 130° C.), there is adapted a method involving collision and centrifugal forces wherein a flat or bowl-shaped screen, a sieve plate, or a wheel having radial bars is rotated and a melt mixture is fed in one or more vertical streams onto the rotating screen, sieve plate or wheel. This is because the higher the viscosity of the melt, the larger the energy required for dividing the melt mixture into droplets. When the melt mixture drops through the rotating screen, sieve plate or wheel having radial bars, its current is cut with the screen thereby droplets are formed. In this case, as different from the case of a conventional rotary disk, the melt mixture is not shaken off in the horizontal direction of the disk but is divided into droplets while dropping in the vertical direction. Therefore, there are few droplets flying in the horizontal direction because, as different from the case of a plate, there as so many air gaps in the screen rotating at a comparatively high speed that vertical passage is possible.

When the desired particle size of product is small, the division of the melt mixture into droplets is carried out at a high speed rotation. In this case, the amount flying in the horizontal direction increases. In order to control the flying in the horizontal direction, air is introduced vertically downward or at a proper angle from a proper place around the rotary screen, sieve plate or wheel having radial bars or between the rotary screen, sieve plate or wheel having radial bars and the tower wall to form an air curtain around the rotary screen, sieve plate or wheel having radial bars. The size of the produced grains can be adjusted by the number of revolutions and the size of the screen meshes. The size of the screen meshes is preferably 4 to 20 meshes per linear inch and the number of revolutions is preferably 200 to 3000 per minute.

In solidifying by cooling the high temperature liquid droplets formed as described above, the means for dividing a melt mixture into droplets are provided in the top part of a conventional prilling tower and a current of cooling air is fed from the lower part of the tower so that the droplets dropping through the tower may be cooled and solidified. Alternatively, the formed liquid droplets may be dropped into a cooling liquid which does not dissolve them so as to be cooled and solidified.

The method of this invention can be effectively used in preparing compound fertilizers using mixing ratio (the weight of the powder mixture of phosphate and/or potassium salt to the weight of the melt solution of urea and/or ammonium nitrate) of not more than 3. The ratio of phosphate to potassium salt when both are employed preferably can vary from 0.1 to 10 weight parts of phosphate per weight part of potassium salt. The proportions of urea and/or ammonium nitrate and said phosphate and/or potassium salt depend largely upon the desired composition or $N:P_2O_5:K_2O$ values desired in the final product.

The process of the present invention shall now be explained with reference to the accompanying drawing which is a flow-diagram showing the process of the present invention.

A current 2 of a urea melt or an aqueous solution of 85 to 95% urea from a storage tank 1 is sprayed onto the liquid surface in a melt mixing tank 3. Usually, the temperature of such urea melt is 130 to 150° C. and that of such aqueous solution of urea is 100 to 120° C. But, in the case of using the aqueous solution of urea, it may be sprayed at such high temperatures as 110° C. to 140° C. so that the evaporation of water in spraying may be accomplished. Required amounts of fine powders of phosphate and potassium salt are taken out of respective storage tanks 4 and 5 and are mixed together to form a current 6 of the mixed powder. The powder current 6 is mixed with an air current 8 preheated by an air preheater 7 to form current 9 and is pneumatically conveyed to a cylone separator 10 while the mixed powder is preheated to 60 to 200° C., preferably 70 to 150° C. The current 9 is separated into the mixed powder and air by means of a cyclone separator 10. A current 11 of the separated mixed powder at 60 to 200° C. is fed to the melt mixing tank 3 in a dispersed state as much as possible. The current 12 of the air separated by the cyclone separator is circulated to the air preheater 7 or is discarded. The melt mixture in the melt mixing tank 3 is strongly stirred with a stirrer 13 such as one of a multistage turbine blade type. The temperature of the melt mixing tank 3 is kept at 100 to 140° C. by auxiliary heating with a steam jacket provided on the peripheral wall. The phosphate and potassium salt may be preheated separately without being mixed before feeding to the melt mixing tank 3. A current 14 of the resulting melt mixture having a viscosity of 500 to 5000 centipoises measured at 130° C. in the case of mixtures of phosphate, potassium salt and urea, ammonium nitrate and mixtures thereof or 100 to 4000 centipoises in the case of mixtures of phosphate or potassium salts with urea or ammonium nitrate (different depending on the desired composition of the produced compound fertilizer) produced in the melt mixing tank 3 is fed to a rotary screen 16, or a stationary or vibrating screen or a rotary sieve plate or a wheel having radial bars, in the top part of a prilling tower 15 and is divided into liquid droplets. The produced liquid droplets are cooled by being brought into contact countercurrently with a current 17 of air fed from the bottom part of the tower and a current 18 of secondary air sucked in by the draft action of the tower and thereby they are solidified. The solidified droplets drop into a fluidizing zone 19, are fluidized there, overflow as perfectly cooled, and are continuously taken out as a current 20 of prills. The current 20 of prills has a current 23 of large grains or grains of different shapes removed with a trommel screen 21 and the rest is taken out as a current 22 of product. The air current rising through the prilling tower 15 is discharged through an air discharging port 24 of a shutter type. Further, in making liquid droplets, an air current 25 may be fed downward around the rotary screen from the top part of the tower so that any liquid droplets flying towards the peripheral wall part of the tower from the rotary screen or the like may be returned toward the center of the tower and the liquid droplets may be prevented from being deposited on the tower wall.

According to the present invention, in producing a granular compound fertilizer of high analysis containing nitrogen, phosphorus and/or potassium by a prilling method, a raw material melt mixture can be prepared easily. In prilling the melt mixture formed, not only a melt having a comparatively low viscosity and containing no solid but also a melt or melt suspension having a high viscosity can be very easily divided into droplets without interruption of the operation and the yield of the prilled product is very high. Further, there is no need for drying the product or for the recirculation of product to the previous steps due to deviations of the composition of the product and, thus, a highly economical operation is provided.

The following examples illustrate the invention but are not to be construed as limiting. All parts and percentages are on a weight basis, temperatures are in degrees centigrade, and mesh values are given in meshes per inch.

EXAMPLE 1

1.5 kg. of molten urea were fed into a batch type mixer provided with a high speed stirrer and dipped in an oil bath at 150 to 170° C., 1.2 kg. of ammonium dihydrogen phosphate and 1.0 kg. of potassium chloride preheated to 120° C. were then added thereto and they were vigorously stirred at 130° C. to form a melt mixture. With the lapse of time, the viscosity of the melt mixture was measured. In 6 minutes, a fluid suspension melt having a minimum viscosity of 500 to 1000 centipoises at 130° C. was obtained. When this was further stirred, in 5 minutes, the viscosity began to rise, thereafter fluidity was quickly lost and it became impossible to prill.

For comparison, the following experiments which do not illustrate the invention were carried out:

Experiment 1

When ammonium phosphate and potassium chloride at normal temperature were added under the same conditions as are mentioned above, the time required until a fluid melt was obtained was 8 minutes and the stable time until the quick rise of the viscosity occurred was about 3 minutes.

Experiment 2

In the above-mentioned mixer, powders of urea, ammonium phosphate and potassium chloride were mixed in the above-mentioned ratio and melted without preheating. But, with such ordinary stirrer as used in this example, it was impossible to stir the melt mixture. The melt mixture was kneaded with a small shovel. In about 20 minutes a fluid melt of 1000 to 1500 centipoises at 130° C. was obtained, but its stable time was only 2 minutes.

EXAMPLE 2

1.2 kg. of molten urea were fed into the same mixer as used in Example 1 and 1.3 kg. of ammonium dihydrogen phosphate preheated to 70° C. were added thereto. When the mixture was heated to 130° C. under stirring, in 4 minutes, a fluid melt mixture of 300 to 500 centipoises at 130° C. was obtained. When 1.2 kg. of potassium chloride preheated to 70° C. were added thereto under the same conditions and the melt mixture was maintained at 120 to 130° C., in 2 minutes, a fluid melt of about 1000 to 1500 centipoises at 130° C. was obtained. By further continuing the stirring, the fluidity could be maintained for 7 minutes.

EXAMPLE 3

In a jacketed melt mixing tank having a capacity of 10 liters, 15 weight parts of molten urea and a mixed powder of 12 weight parts of ammonium dihydrogen phosphate and 10 weight parts of potassium chloride preheated to 70 to 90° C. were continuously fed at this flow ratio. The temperature of the mixing tank was maintained at 120° C. to form a melt mixture of 1000 to 1500 centipoises at 130° C. This melt was divided into droplets by being fed at the rate of 100 kg./hr. to collide with a stainless steel screen of 9 meshes per inch set 400 mm. below the bottom of the mixing tank and was solidified by being dropped into cooling oil (machine oil) provided further below. The grain distribution was as follows:

| | Percent by weight |
|---|---|
| 5–7 meshes | 45 |
| 7–12 meshes | 47 |
| 12–16 meshes | 5.5 |
| 16–20 meshes | 2.5 |

The composition of the obtained product approximated $N:P_2O_5:K_2O=22:16:16$. There was neither deposition on nor clogging of the meshes of the screen at all.

EXAMPLE 4

A melt mixture prepared under the same conditions as in Example 3 was fed at a rate of 200 kg./hr. onto one point between the center and the peripheral edge of a rotary screen of a diameter of 12 cm. and 4 meshes per inch made of stainless steel, was divided into droplets by rotating the screen at 700 r.p.m. and the resulting droplets were dropped into oil (spindle oil) so as to be cooled and solidified. The grain distribution of the obtained granular product was as follows:

| | Percent by weight |
|---|---|
| 5–7 meshes | 38 |
| 7–12 meshes | 48 |
| 12–16 meshes | 11 |
| Passing through 16 meshes | 3 |

There was substantially no flying of the melt in the horizontal direction. It was possible to collect substantially all the droplets within a circle of a diameter of 1 m. at a vertical distance of 1 m. below the rotary screen. There was no clogging of the meshes of the screen and no deposition of the melt on the screen at all. The composition of the obtained product was shown to be $N:P_2O_5:K_2O=22:16:16$. There was substantially no deviation in composition from grain size to grain size.

EXAMPLE 5

A mixture of ammonium dihydrogen phosphate and potassium chloride preheated to 90° C. at 660 kg./hr. (360 kg. of ammonium dihydrogen phosphate and 300 kg. of potassium chloride) and an aqueous solution of urea of a concentration of about 90% from a concentrating step in a urea plant at 330 kg./hr. were continuously fed into a steam jacketed melt mixing tank having a capacity of 0.1 m.³ and located at the top of a prilling tower of an effective height of 35 m. and were melted and mixed. The aqueous solution of urea was heated to 130° C. in the conveying pipe and was sprayed through a nozzle onto the surface of the melt. The resulting melt mixture having a temperature of 135° C. and a viscosity of 2000 to 3000 centipoises at 125° C. was fed onto a rotary screen of 6 meshes of stainless steel rotating at 1500 r.p.m. to divide into droplets. The droplets were cooled by coming into contact with cooling air rising through the tower at a velocity of 3 m./sec. so as to be solidified while they dropped through the tower and were then taken as a granular product out of a fluidizing zone in the bottom part of the tower. The obtained product prills were produced at the rate of 970 kg./hr., were of a composition approximating $N:P_2O_5:K_2O=18:18:18$ and had substantially no deviation of composition from grain to grain. Further, the product was of a water content of 1.1% and required no subsequent drying. The particle size distribution of the product was as follows:

| | Percent by weight |
|---|---|
| 6–8 meshes | 12.0 |
| 8–10 meshes | 21.8 |
| 10–16 meshes | 46.1 |
| 16–20 meshes | 12.4 |
| Passing through 20 meshes | 7.7 |

EXAMPLE 6

1.5 kg. of molten urea were put into a batch type melt mixing tank dipped in an oil bath at 150 to 170° C., 2.0 kg. of ammonium dihydrogen phosphate preheated to 120° C. and passing through a sieve of 60 meshes were added thereto and the mixture was vigorously stirred at a temperature of 130° C. The viscosity of the melt mixture was measured with the lapse of time. In 6 minutes a fluid melt mixture having a minimum viscosity of 1000 to 1500 centipoises at 130° C. was obtained. When this mixture was further stirred, in 5 minutes, the viscosity began to rise, thereafter fluidity was quickly lost and it became impossible to prill the mixture.

For comparison, the following experiments which do not illustrate the invention were made:

Experiment 1

When ammonium dihydrogen phosphate at normal temperature was added under the same conditions as are mentioned above, the time required until a fluid melt mixture was obtained was 9 minutes and the stable time until the viscosity showed a quick rise was about 3 minutes.

Experiment 2

In the above-mentioned mixing tank, urea and a powder of ammonium dihydrogen phosphate at normal temperature were mixed at the above-mentioned mixing ratio and melted. But with such conventional stirrer as used in this example, it was impossible to stir the melt mixture. It, therefore, was mixed and kneaded by means of a small shovel. In about 18 minutes, a fluid melt mixture of a viscosity of 1500 to 2000 centipoises at 130° C. was obtained. The stable time until the viscosity showed a quick rise was about 2 minutes.

EXAMPLE 7

315 kg./hr. of molten urea and 285 kg./hr. of potassium chloride preheated to 100° C. and passing through a sieve of 60 meshes were fed into a melt mixing tank of a capacity of 70 liters provided with a stirrer and a steam jacket and were mixed by stirring at a temperature of 120° C. to produce a melt mixture of a viscosity of 50 to 100 centipoises at 120° C. 600 kg./hr. of the melt mixture were dropped out of the melt mixing tank, were divided into liquid droplets by being made to collide with a screen of 16 meshes made of a stainless steel and set 70 cm. below the melt mixing tank. The droplets were solidified by being dropped into a cooling oil (spindle oil) set below the screen to result in a granular product. The composition of the obtained product was uniform at about $N:P_2O_5=23:28$. The grain distribution was as follows:

| | Percent by weight |
|---|---|
| 5–12 meshes | 35 |
| 12–20 meshes | 60 |
| Not more than 20 meshes | 5 |

EXAMPLE 8

590 kg./hr. of ammonium dihydrogen phosphate preheated to 90° C. and passing through a sieve of 60 meshes and 450 kg./hr. of an aqueous solution of urea of a concentration of 90% from a concentrating step in a urea plant were continuously fed into a melting and mixing tank having a capacity of 0.1 m.³ and located in the top of a prilling tower of an effective height of 35 m. and were mixed together. The temperature of the melt mixing tank was kept 130° C. by steam heating. Further, the aqueous solution of urea was heated to 140° C. in the piping during conveyance and was sprayed onto the liquid surface in the melt mixing tank. The melt mixture of a temperature of 130° C. and a viscosity of 1500 to 2000 centipoises at 130° C. was dropped out of the melt mixing tank and was divided into liquid droplets by being fed onto a rotary screen of 12 meshes made of stainless steel rotating at 800 r.p.m. The produced liquid droplets were cooled by cooling air rising through the tower at a velocity of 2 m./sec. so as to be solidified while they dropped through the tower. 990 kg./hr. of a granular product were taken out of the bottom part of the tower.

The composition of the product was about $$N:P_2O_5=25:30.$$

There was substantially no deviation of composition from grain to grain. The water content in the product was 0.8% by weight. Its grain distribution was as follows:

| | Percent by weight |
|---|---|
| 5–12 meshes | 70 |
| 12–20 meshes | 23 |
| Not more than 20 meshes | 7 |

In each of the above examples ammonium nitrate can be substituted for all or a part of the urea to provide equivalent results.

EXAMPLE 9

Equipment used in Example 8 was used in this example. 650 kg./hr. of molten ammonium nitrate and 550 kg./hr. of ammonium dihydrogen phosphate preheated to 80° C. and passing through a sieve of 60 meshes were continuously fed into the melt mixing tank and were mixed at 140° C. by stirring to form a melt mixture. 1200 kg./hr. of the melt mixture at a temperature of 140° C. and having a viscosity of 500 to 1000 centipoises at 140° C. were dropped out of the melt mixing tank and were divided into liquid droplets by being fed onto a rotary screen of 12 meshes made of stainless steel rotating at 800 r.p.m. The produced liquid droplets were cooled by cooling air rising through the prilling tower at a velocity of 2 m./sec. so as to be solidified while they dropped through the tower. 1190 kg./hr. of a granular product were taken out of the bottom part of the tower.

The composition of the product was about $$N:P_2O_5=25:25$$

and was uniform from grain to grain. Its grain distribution was as follows:

| | Percent by weight |
|---|---|
| 5–12 meshes | 60 |
| 12–20 meshes | 35 |
| Not more than 20 meshes | 5 |

In each of the above examples diammonium hydrogen phosphate, potassium dihydrogen phosphate, dipotassium hydrogen phosphate and tripotassium phosphate each can be separately substituted for the ammonium phosphate specified to provide equivalent results.

What is claimed is:

1. A process for producing a granular compound fertilizer containing nitrogen and at least one member of the group consisting of phosphorus and potassium which comprises preheating at least one compound selected from the group consisting of an ammonium phosphate, a potassium orthophosphate and a solid potassium salt selected from the group consisting of potassium chloride, potassium sulfate and potassium nitrate, mixing said preheated compound with a melt liquid of a material selected from the group consisting of urea, ammonium nitrate and mixtures thereof to form a melt mixture, dividing the melt mixture into liquid droplets, and cooling the resulting liquid droplets to solidify them into granular form.

2. Process as claimed in claim 1 wherein both one phosphate from the class consisting of ammonium phosphates and potassium phosphates and one of the said potassium salts are preheated and mixed with said melt liquid.

3. Process as claimed in claim 1 wherein only one compound from said group is preheated and mixed with said melt liquid.

4. Process as claimed in claim 1 wherein said ammonium phosphate is selected from the class consisting of ammonium dihydrogen phosphate and diammonium hydrogen phosphate and said potassium phosphate is selected from the class consisting of potassium dihydrogen phosphate and dipotassium hydrogen phosphate.

5. Process as claimed in claim 1 wherein at least one compound selected from the group consisting of ammonium sulfate, ammonium chloride, calcium superphosphate, calcium sulfate and magnesium hydroxide is also added to said melt mixture.

6. Process as claimed in claim 1 wherein said compound is preheated to a temperature of 60° C. to 200° C. prior to mixing with said melt liquid.

7. Process as claimed in claim 2 wherein one of said preheated phosphates and said preheated solid potassium salt are mixed together prior to being mixed with the melt liquid.

8. Process as claimed in claim 2 wherein a part of said preheated phosphate and said preheated potassium salt is added to said melt liquid to form a melt premixture and then the rest of said preheated solid phosphate and said preheated potassium salt is added to said melt mixture to form the final melt mixture to be divided into liquid droplets and cooled into granular form.

9. Process as claimed in claim 1 wherein said compound is of a particle size small enough to wholly pass through a sieve of 30 meshes per linear inch.

10. Process as claimed in claim 1 wherein said compound is continuously mixed with said melt solution by continuously spraying said melt liquid into a mixing zone and continuously feeding said compound to said mixing zone to continuously form said melt mixture in said mixing zone.

11. Process as claimed in claim 1 wherein said melt mixture is maintained at a temperature of 100° C. to 140° C. during its formation.

12. Process as claimed in claim 1 wherein said melt mixture is divided into liquid droplets by forming said mixture into a falling stream and colliding said stream with a solid object to sub-divide it into said droplets.

13. Process as claimed in claim 12 wherein said object is a perforated sheet.

14. Process as claimed in claim 13 wherein said perforated sheet is rotating.

15. Process as claimed in claim 13 wherein said perforated sheet is vibrating.

16. Process as claimed in claim 13 wherein said perforated sheet is a screen.

17. Process as claimed in claim 13 wherein said perforated sheet is stationary.

18. Process as claimed in claim 12 wherein said object is a rotating wheel having radiating spokes which collide with said stream.

19. Process as claimed in claim 12 wherein an air current is fed around said object to control the flying of said liquid droplets in the lateral direction.

20. Process as claimed in claim 12 wherein said liquid droplets are cooled with a cooling medium selected from the group consisting of cool air and an inert liquid.

21. Process as claimed in claim 10 wherein said melt liquid is an aqueous urea solution of 85 to 95 weight percent solids and said melt mixture is divided into liquid droplets by forming said mixture into a falling stream and colliding said stream with a solid object to sub-divide it into said droplets.

22. Process as claimed in claim 21 wherein an air current is fed around said object to control the flying of said liquid droplets in the lateral direction.

23. A process according to claim 1 wherein the mixing ratio of said compound to said melt solution is not more than 3.

References Cited

UNITED STATES PATENTS

| 3,192,032 | 6/1965 | Thomas | 71—28 |
| 3,369,885 | 2/1968 | Takahashi et al. | |

REUBEN FRIEDMAN, Primary Examiner

R. BARNES, Assistant Examiner

U.S. Cl. X.R.

71—64